(12) United States Patent
Li et al.

(10) Patent No.: US 12,122,724 B2
(45) Date of Patent: Oct. 22, 2024

(54) COMPOSITE CERAMIC MEMBER AND METHOD FOR PREPARATION THEREOF, VAPORIZATION ASSEMBLY, AND ELECTRONIC CIGARETTE

(71) Applicant: SHENZHEN SMOORE TECHNOLOGY LIMITED, Shenzhen (CN)

(72) Inventors: Bo Li, Shenzhen (CN); Feng Chen, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 312 days.

(21) Appl. No.: 17/630,241

(22) PCT Filed: Jun. 30, 2020

(86) PCT No.: PCT/CN2020/099070
§ 371 (c)(1),
(2) Date: Jan. 26, 2022

(87) PCT Pub. No.: WO2021/027417
PCT Pub. Date: Feb. 18, 2021

(65) Prior Publication Data
US 2022/0281775 A1    Sep. 8, 2022

(30) Foreign Application Priority Data
Aug. 12, 2019   (CN) .......................... 201910740263.9

(51) Int. Cl.
*B32B 18/00*    (2006.01)
*A24F 40/44*   (2020.01)
(Continued)

(52) U.S. Cl.
CPC ............ *C04B 38/007* (2013.01); *A24F 40/44* (2020.01); *A24F 40/70* (2020.01); *B28B 1/16* (2013.01);
(Continued)

(58) Field of Classification Search
CPC .......... A24F 40/44; A24F 40/46; A24F 40/70; B28B 1/16; B32B 18/00;
(Continued)

(56) References Cited

U.S. PATENT DOCUMENTS

2015/0359262 A1  12/2015  Liu et al.
2016/0316819 A1  11/2016  Zhou et al.
2018/0064170 A1   3/2018  Peuchert et al.

FOREIGN PATENT DOCUMENTS

CN       105979614 A     9/2016
CN       107149169 A     9/2017
(Continued)

OTHER PUBLICATIONS

Extended European Search Report for European Application No. 20852755.6 mailed Jul. 31, 2023.
(Continued)

*Primary Examiner* — Lawrence D Ferguson
(74) *Attorney, Agent, or Firm* — Dorsey & Whitney LLP

(57) ABSTRACT

Provided are a composite ceramic member and a method for preparation thereof, a vaporization assembly, and an electronic cigarette. The composite ceramic member comprises a first ceramic layer, a second ceramic layer, and a third ceramic layer stacked in sequence; in the first ceramic layer, the second ceramic layer, and the third ceramic layer, the first ceramic layer has the smallest pore size and the highest thermal conductivity, the second ceramic layer has the largest porosity, and the third ceramic layer has the highest compressive strength.

10 Claims, 2 Drawing Sheets

(51) Int. Cl.
*A24F 40/70* (2020.01)
*B28B 1/16* (2006.01)
*C04B 35/10* (2006.01)
*C04B 35/14* (2006.01)
*C04B 35/565* (2006.01)
*C04B 35/638* (2006.01)
*C04B 35/64* (2006.01)
*C04B 38/00* (2006.01)

(52) U.S. Cl.
CPC .............. *B32B 18/00* (2013.01); *C04B 35/10* (2013.01); *C04B 35/14* (2013.01); *C04B 35/565* (2013.01); *C04B 35/638* (2013.01); *C04B 35/64* (2013.01); *C04B 38/0054* (2013.01); *C04B 38/0064* (2013.01); *C04B 2235/3217* (2013.01); *C04B 2235/3418* (2013.01); *C04B 2235/3826* (2013.01); *C04B 2235/6025* (2013.01); *C04B 2235/604* (2013.01); *C04B 2235/6567* (2013.01); *C04B 2235/9607* (2013.01)

(58) Field of Classification Search
CPC ... C04B 2111/00612; C04B 2235/3217; C04B 2235/3418; C04B 2235/3826; C04B 2235/602; C04B 2235/6022; C04B 2235/6025; C04B 2235/604; C04B 2235/6567; C04B 2235/96; C04B 2235/9607; C04B 2237/341; C04B 2237/343; C04B 2237/365; C04B 2237/366; C04B 2237/368; C04B 2237/58; C04B 2237/586; C04B 2237/704; C04B 35/00; C04B 35/10; C04B 35/14; C04B 35/565; C04B 35/6269; C04B 35/638; C04B 35/64; C04B 38/0054; C04B 38/0064; C04B 38/007; C04B 38/0074; C04B 38/06
See application file for complete search history.

(56) References Cited

FOREIGN PATENT DOCUMENTS

| | | | |
|---|---|---|---|
| CN | 109105958 | A | 1/2019 |
| CN | 109363248 | A | 2/2019 |
| CN | 109527657 | A | 3/2019 |
| CN | 109721344 | A | 5/2019 |
| CN | 208875415 | U | 5/2019 |
| CN | 109875123 | A | 6/2019 |
| CN | 109984387 | A | 7/2019 |
| CN | 110037351 | A | 7/2019 |
| CN | 110041092 | A | 7/2019 |
| IN | 108272136 | A | 7/2018 |
| WO | 2013149484 | A1 | 10/2013 |

OTHER PUBLICATIONS

International Search Report and Written Opinion from International Application No. PCT/CN2020/099070 mailed Sep. 28, 2020.
Office Action for Chinese Application No. 201910740263.9 mailed Jun. 15, 2021.
Shujie, et al., "Analysis of Atomizing Technology for Heating Wire of Electronic Cigarette", Electronic Measurement Technology, Sep. 2018, pp. 119-112.

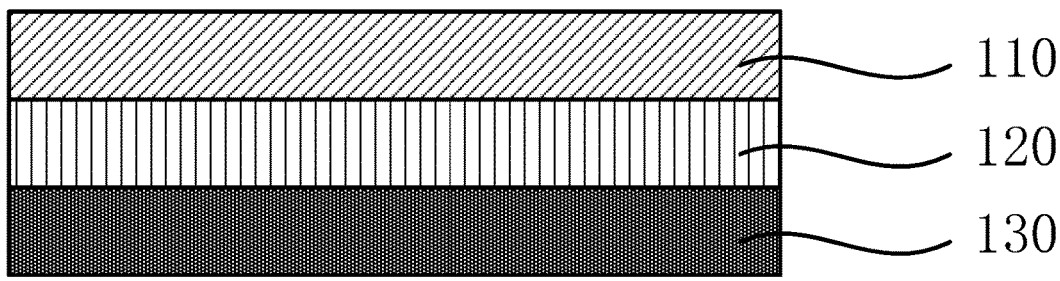

FIG. 1

```
┌─────────────────────────────────────────────────────────────┐
│ Obtaining a first ceramic slurry, a second ceramic slurry, and a third ceramic │
│   slurry respectively, and tape casting the first ceramic slurry, the second   │──S101
│   ceramic slurry, and the third ceramic slurry respectively, to obtain a first │
│         ceramic layer, a second ceramic layer, and a third ceramic layer       │
└─────────────────────────────────────────────────────────────┘
                                    │
                                    ▼
┌─────────────────────────────────────────────────────────────┐
│  Sequentially stacking the first ceramic layer, the second ceramic layer, and  │
│   the third ceramic layer, performing dry pressing or isostatic pressing, and  │──S102
│           then sintering to obtain the composite ceramic member                │
└─────────────────────────────────────────────────────────────┘
```

FIG. 2

COMPOSITE CERAMIC MEMBER AND METHOD FOR PREPARATION THEREOF, VAPORIZATION ASSEMBLY, AND ELECTRONIC CIGARETTE

TECHNICAL FIELD

The present disclosure relates to the technical field of electronic cigarettes, and in particular, to a composite ceramic member, a method of preparing the same, an atomization assembly, and an electronic cigarette.

BACKGROUND

An electronic cigarette atomization core is a core component of an electronic cigarette. Electronic cigarette atomization cores on the market are generally ceramic atomization cores. At present, the ceramic atomization cores still have poor comprehensive performance, which have defects such as a low oil guide rate, easy dry burning failure, and a short service life.

SUMMARY

Based on this, there is a need to provide a composite ceramic member for electronic cigarettes with better comprehensive performance.

A composite ceramic member, including a first ceramic layer, a second ceramic layer, and a third ceramic layer sequentially stacked, among the first ceramic layer, the second ceramic layer, and the third ceramic layer, the first ceramic layer having a smallest pore size and a highest thermal conductivity, the second ceramic layer having a largest porosity, and the third ceramic layer having a highest compressive strength.

A method of preparing a composite ceramic member, the method including the following steps:
  obtaining a first ceramic slurry, a second ceramic slurry, and a third ceramic slurry respectively, and tape casting the first ceramic slurry, the second ceramic slurry, and the third ceramic slurry respectively, to obtain a first ceramic layer, a second ceramic layer, and a third ceramic layer; among the first ceramic layer, the second ceramic layer, and the third ceramic layer, the first ceramic layer having a smallest pore size and a highest thermal conductivity, the second ceramic layer having a largest porosity, and the third ceramic layer having a highest compressive strength; and
  sequentially stacking the first ceramic layer, the second ceramic layer, and the third ceramic layer, performing dry pressing or isostatic pressing, and then sintering to obtain the composite ceramic member.

A method of preparing a composite ceramic member, the method including the following steps:
  obtaining a first ceramic slurry, a second ceramic slurry, and a third ceramic slurry respectively, and injection-molding or tape casting the second ceramic slurry, to obtain a second ceramic layer; and
  coating the first ceramic slurry and the third ceramic slurry to two opposite sides of the second ceramic layer respectively, and curing the first ceramic slurry and the third ceramic slurry to obtain a first ceramic layer and a third ceramic layer, then sintering to obtain the composite ceramic member; among the first ceramic layer, the second ceramic layer, and the third ceramic layer, the first ceramic layer having a smallest pore size and a highest thermal conductivity, the second ceramic layer having a largest porosity, and the third ceramic layer having a highest compressive strength.

An atomization assembly, including a heating element and the aforementioned composite ceramic member; the heating element being stacked on a surface of the first ceramic layer away from the second ceramic layer.

An electronic cigarette, including the atomization assembly described above.

Details of one or more embodiments of the present application are set forth in the following accompanying drawings and descriptions. Other features, objectives, and advantages of the present application will become obvious with reference to the specification, the accompanying drawings, and the claims.

BRIEF DESCRIPTION OF THE DRAWINGS

FIG. 1 is a schematic view of a composite ceramic member according to an implementation;

FIG. 2 is a flowchart of a method of preparing a composite ceramic member according to an implementation;

Figure 3:
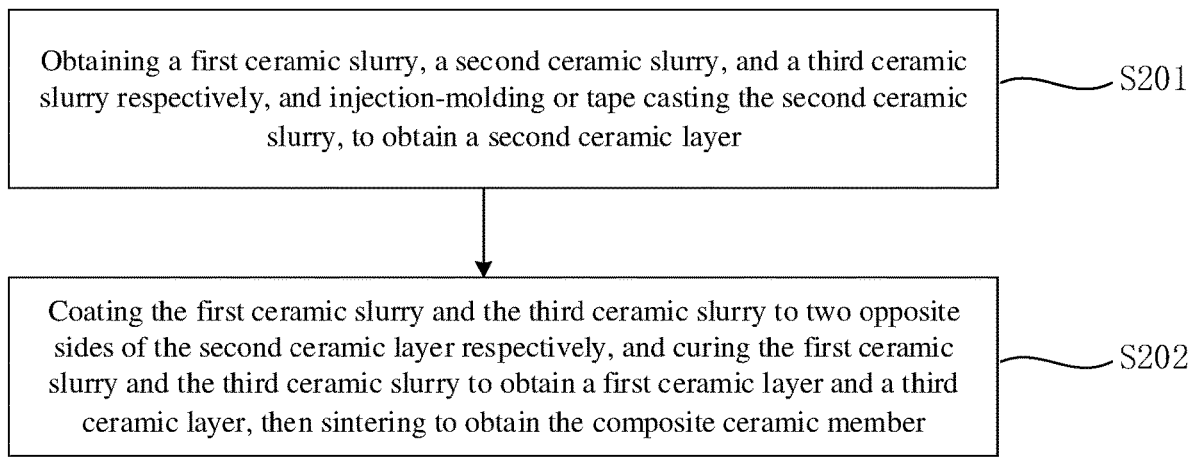
FIG. 3 is a flowchart of a method of preparing a composite ceramic member according to another implementation.

In order to better describe and illustrate embodiments and/or examples of those inventions disclosed herein, reference may be made to one or more accompanying drawings. Additional details or examples used to describe the accompanying drawings should not be considered as limitations on the scope of any of the disclosed inventions, the presently described embodiments and/or examples, and the presently understood best mode of these inventions.

DETAILED DESCRIPTION OF THE EMBODIMENTS

For easy understanding of the present disclosure, a more comprehensive description of the present disclosure is given below with reference to the accompanying drawings. Preferred embodiments of the present disclosure are given in the accompanying drawings. However, the present disclosure may be implemented in many different forms and is not limited to the embodiments described herein. On the contrary, these embodiments are provided to understand the disclosed content of the present disclosure more thoroughly and comprehensively.

Unless otherwise defined, all technical and scientific terms used herein have the same meaning as commonly understood by those of ordinary skill in the art to which the present disclosure belongs. The terms used in the specification of the present disclosure are intended only to describe particular embodiments and are not intended to limit the present disclosure.

A composite ceramic member 100 is provided according to an implementation. Referring to FIG. 1, the composite ceramic member 100 includes a first ceramic layer 110, a second ceramic layer 120, and a third ceramic layer 130 sequentially stacked. Among the first ceramic layer 110, the second ceramic layer 120, and the third ceramic layer 130, the first ceramic layer 110 has the smallest pore size and the highest thermal conductivity, the second ceramic layer 120 has the largest porosity, and the third ceramic layer 130 has the highest compressive strength.

The composite ceramic member 100 has a unique three-layer composite structure. The first ceramic layer 110 has the highest thermal conductivity and the smallest pore size.

When the heating elements are arranged on a surface of a side of the first ceramic layer 110 away from the second ceramic layer 120, due to the high thermal conductivity of the first ceramic layer 110, heat of the heating elements may be effectively dispersed, which reduces a dry burning temperature, thereby preventing a problem of product life caused by dry burning. In addition, the first ceramic layer 110 has a smaller pore size, which can make the consistency of the heating elements better, thereby improving stability of atomization and optimizing an atomization effect.

Further, the first ceramic layer 110 may have a pore size ranging from 5 μm to 9 μm and a thermal conductivity ranging from 1.5 W/m·K to 2.0 W/m·K. The first ceramic layer 110 having the above pore size and thermal conductivity can effectively prevent concentration of the heat of the heating elements, so that temperature distribution on an entire atomization surface is more uniform, and the dry burning temperature is lower, to prevent the generation of burnt taste, which is conducive to improving the atomization effect and prolonging the service life of the product. The first ceramic layer 110 may have a thickness ranging from 0.1 mm to 0.7 mm. When the thickness of the first ceramic layer 110 is within the above range, the above functions can be preferably played. The first ceramic layer 110 may be made of at least one material selected from the group consisting of alumina ceramic, silicon carbide ceramic, silicon nitride ceramic, and aluminum nitride ceramic.

The second ceramic layer 120 has the largest porosity, which is conducive to improving an oil guide rate of the composite ceramic member, enhancing the smoke taste, and improving inhaling experience of users. Further, the second ceramic layer 120 may have a porosity ranging from 55% to 65%. When the porosity of the second ceramic layer 120 is within the above range, a better oil guide effect can be achieved. The pore size of the second ceramic layer 120 may be adjusted within a wide range, for example, 20 μm to 200 μm. The second ceramic layer 120 may have a thickness ranging from 0.4 mm to 1.2 mm. When the thickness of the second ceramic layer 120 is within the above range, the above functions can be preferably played. The second ceramic layer 120 may be made of at least one material selected from the group consisting of silicon oxide ceramic, alumina ceramic, cordierite ceramic, and silicon nitride ceramic.

The third ceramic layer 130 has the highest compressive strength, which may significantly enhance the overall strength of the composite ceramic member, facilitating assembly in cigarette accessories. Further, the third ceramic layer 130 may have a compressive strength ranging from 50 MPa to 70 MPa. The third ceramic layer 130 may have a porosity ranging from 30% to 50% and a pore size ranging from 10 μm to 100 μm. The third ceramic layer 130 may have a thickness ranging from 0.3 mm to 1.5 mm. The third ceramic layer 130 may be made of at least one material selected from the group consisting of silicon oxide ceramic, silicon carbide ceramic, alumina ceramic, cordierite ceramic, and silicon nitride ceramic.

A method of preparing the composite ceramic member is provided according to an implementation. The method includes the following steps.

At S101, a first ceramic slurry, a second ceramic slurry, and a third ceramic slurry are obtained, respectively, and the first ceramic slurry, the second ceramic slurry, and the third ceramic slurry are tape cast respectively, to obtain a first ceramic layer 110, a second ceramic layer 120, and a third ceramic layer 130.

The first ceramic slurry, the second ceramic slurry, and the third ceramic slurry may be obtained by mixing and ball-milling ceramics, pore-forming agents, and optional auxiliary materials. In order to enable the first ceramic layer 110, the second ceramic layer 120, and the third ceramic layer 130 obtained to have the above properties, in one embodiment, based on 100 parts by weight of the first ceramic slurry, the first ceramic slurry includes 55 to 85 parts by weight of a first ceramic and 15 to 45 parts by weight of a first pore-forming agent. The first ceramic is at least one selected from the group consisting of alumina ceramic, silicon carbide ceramic, silicon nitride ceramic, and aluminum nitride ceramic.

In one embodiment, based on 100 parts by weight of the second ceramic slurry, the second ceramic slurry includes 35 to 65 parts by weight of a second ceramic and 35 to 65 parts by weight of a second pore-forming agent. The second ceramic is at least one selected from the group consisting of silicon oxide ceramic, alumina ceramic, cordierite ceramic, and silicon nitride ceramic.

In one embodiment, based on 100 parts by weight of the third ceramic slurry, the third ceramic slurry includes 50 to 75 parts by weight of a third ceramic and 25 to 50 parts by weight of a third pore-forming agent. The third ceramic is at least one selected from the group consisting of silicon oxide ceramic, silicon carbide ceramic, alumina ceramic, cordierite ceramic, and silicon nitride ceramic.

The above first pore-forming agent, the second pore-forming agent, and the third pore-forming agent are all conventional types in the art, and are, for example, at least one selected from the group consisting of starch, graphite, polystyrene (PS) microspheres, and polymethyl methacrylate (PMMA) microspheres. The first pore-forming agent, the second pore-forming agent, and the third pore-forming agent may be the same or different.

It may be understood by those skilled in the art that the first ceramic slurry, the second ceramic slurry, and the third ceramic slurry each may also contain various common auxiliary materials in the art, such as organic solvents. Specific types and dosages of the auxiliary materials are conventional, which are not described in detail herein.

An operation method of the tape casting is well known to those skilled in the art, which is not specially limited in the present disclosure.

At S102, the first ceramic layer 110, the second ceramic layer 120, and the third ceramic layer 130 are sequentially stacked and subjected to dry pressing or isostatic pressing, and then sintered to obtain the composite ceramic member.

Conditions for the dry pressing may include: a temperature ranging from 70° C. to 80° C., a pressure ranging from 10 MPa to 30 MPa, and a time ranging from 3 min to 20 min.

Conditions for the isostatic pressing may include: a temperature ranging from 70° C. to 80° C., a pressure ranging from 50 MPa to 100 MPa, and a time ranging from 5 min to 20 min.

The method may further include a step of performing binder burnout prior to the sintering. Conditions for the binder burnout include: an air atmosphere, a temperature ranging from 260° C. to 450° C., and a time ranging from 2 h to 5 h. Conditions for the sintering may include: a temperature ranging from 1100° C. to 1300° C., and a time ranging from 30 min to 90 min.

A method of preparing the composite ceramic member is provided according to another implementation. The method includes the following steps.

At S201, a first ceramic slurry, a second ceramic slurry, and a third ceramic slurry are obtained, respectively, and the second ceramic slurry is injection-molded or tape cast, to obtain a second ceramic layer 120.

The preparation methods and formulations of the first ceramic slurry, the second ceramic slurry, and the third ceramic slurry may be obtained with reference to the descriptions above.

Conditions for the injection molding may include: a pressure ranging from 10 MPa to 30 MPa and a temperature ranging from 70° C. to 80° C. When the second ceramic layer 120 is prepared by injection molding, step S201 further includes a step of curing a green body obtained by injection molding. A condition for the curing may include: a temperature ranging from 100° C. to 150° C.

When the second ceramic layer 120 is prepared by tape casting, step S201 further includes a step of sintering a green body obtained by tape casting. A temperature for the sintering ranges from 1100° C. to 1300° C., and a time for the sintering ranges from 30 min to 90 min.

At S202, the first ceramic slurry and the third ceramic slurry are coated to two opposite sides of the second ceramic layer 120 respectively, and are cured to obtain a first ceramic layer 110 and a third ceramic layer 130, which are then sintered to obtain the composite ceramic member.

The first ceramic slurry and the third ceramic slurry may be coated respectively by screen printing or spin coating.

Conditions for the curing may include: a temperature ranging from 100° C. to 150° C., and a time ranging from 60 min to 120 min.

The method may further include a step of performing binder burnout prior to the sintering. Conditions for the binder burnout include: an air atmosphere, a temperature ranging from 260° C. to 450° C., and a time ranging from 2 h to 5 h. Conditions for the sintering may include: a temperature ranging from 1100° C. to 1300° C., and a time ranging from 30 min to 90 min.

Conditions for the sintering may include: a temperature ranging from 1100° C. to 1300° C., and a time ranging from 30 min to 90 min.

Figure 4:
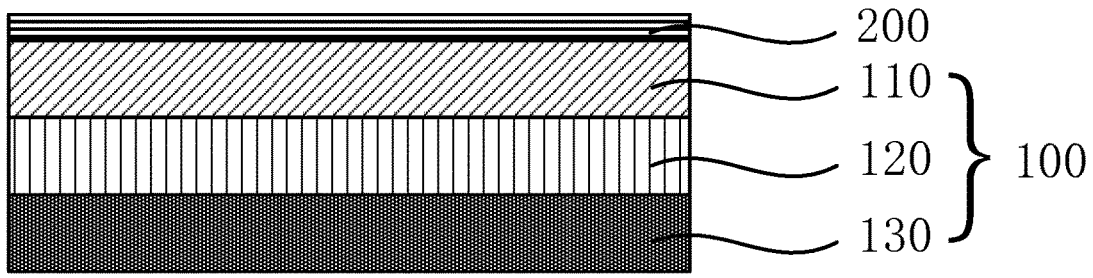
FIG. 4 is a schematic view of an atomization assembly according to an implementation.

An electronic cigarette according to an implementation includes an atomization assembly. The atomization assembly includes the aforementioned composite ceramic member 100 and a heating element 200. Referring to FIG. 4, the heating element 200 is stacked on a surface of the first ceramic layer 110 away from the second ceramic layer 120. The heating element 200 may be a conductive film. The atomization assembly has strong dry burning resistance as well as high matrix compressive strength and a high oil guide speed, and thus has excellent comprehensive performance.

The following examples further illustrate the present disclosure, but are not intended to limit the present disclosure.

In the examples, a thickness of a ceramic layer was tested using a vernier caliper. A pore size was tested using a PSDA-20 micro-filtration membrane pore size distribution meter based on a bubble pressure method. A porosity was tested using a density balance. A resistance value was tested using a RM3544 micro-resistance meter of HIOKI based on a four wire method by adopting a bridge principle. A compressive strength was tested using a compressive strength testing machine based on a GB/T 4740-1999 ceramic material compressive strength testing method.

Example 1

A first ceramic slurry, a second ceramic slurry, and a third ceramic slurry were prepared respectively using a planetary ball mill. The first ceramic slurry was an alumina slurry containing 30 wt % of a pore-forming agent, the second ceramic slurry was a silicon oxide slurry containing 50 wt % of a pore-forming agent, and the third ceramic slurry was a silicon oxide slurry containing 30 wt % of a pore-forming agent. Taking a polyethylene (PE) film as a carrier film, the first ceramic slurry, the second ceramic slurry, and the third ceramic slurry were respectively tape cast by a casting machine into a first ceramic layer with a thickness of 0.4 mm, a second ceramic layer with a thickness of 0.6 mm, and a third ceramic layer with a thickness of 1 mm. The first ceramic layer, the second ceramic layer, and the third ceramic layer were sequentially stacked, and then subjected to isostatic pressing in a warm water isostatic press at a temperature of 70° C. and the highest pressure of 100 MPa for 15 min, to obtain a ceramic green body having a three-layer composite structure. Then, binder burnout was performed on the ceramic green body in a muffle furnace with an air atmosphere at the highest temperature of 450° C. for 5 h. Then, an oxygen inlet valve was closed and the ceramic green body was sintered at 1200° C. for 1 h, to obtain a composite ceramic member. The structure of the composite ceramic member was shown in FIG. 1. Upon detection, the first ceramic layer (alumina ceramic layer) had a pore size of 6 μm, a porosity of 50%, a thermal conductivity of 1.7 W/m·K, and a compressive strength of 50 MPa. The second ceramic layer (silicon oxide ceramic layer) had a pore size of 30 μm, a porosity of 60%, a thermal conductivity of 0.5 W/m·K, and a compressive strength of 45 MPa. The third ceramic layer (silicon oxide ceramic layer) had a compressive strength of 60 MPa, a pore size of 10 μm, a porosity of 40%, and a thermal conductivity of 0.6 W/m·K.

Example 2

Preparation steps of a composite ceramic member in this example are substantially the same as those in Example 1. Their differences are as follows. The first ceramic slurry was a silicon carbide slurry containing 35 wt % of a pore-forming agent, the second ceramic slurry was a silicon oxide slurry containing 50 wt % of a pore-forming agent, and the third ceramic slurry was a silicon oxide slurry containing 30 wt % of a pore-forming agent. The first ceramic layer, the second ceramic layer, and the third ceramic layer obtained by tape casting had a thicknesses of 0.6 mm, 0.9 mm, and 1.5 mm respectively. In the prepared composite ceramic member, the first ceramic layer (silicon carbide ceramic layer) had a pore size of 8 μm, a porosity of 51%, a thermal conductivity of 1.8 W/m·K, and a compressive strength of 48 MPa. The second ceramic layer (silicon oxide ceramic layer) had a pore size of 60 μm, a porosity of 63%, a thermal conductivity of 0.3 W/m·K, and a compressive strength of 40 MPa. The third ceramic layer (silicon oxide ceramic layer) had a compressive strength of 60 MPa, a pore size of 18 μm, a porosity of 41%, and a thermal conductivity of 0.35 W/m·K.

Example 3

A first ceramic slurry, a second ceramic slurry, and a third ceramic slurry were prepared respectively using a planetary ball mill. The first ceramic slurry was an alumina slurry containing 40 wt % of a pore-forming agent, the second ceramic slurry was a silicon oxide slurry containing 50 wt % of a pore-forming agent, and the third ceramic slurry was a silicon carbide slurry containing 30 wt % of a pore-forming agent. The second ceramic slurry was subjected to hot injection molding at 80° C. and 20 MPa, and then was cured in an oven at 120° C. to obtain a second ceramic layer with a thickness of 0.4 mm. The first ceramic slurry was coated to one side of the second ceramic layer by screen printing and was kept at 100° C. for 1 h in an oven, so as to obtain a first ceramic layer with a thickness of 0.6 mm on one side of the second ceramic layer. The third ceramic slurry was coated to the other side of the second ceramic layer by screen printing and was kept at 100° C. for 1 h in the oven, so as to obtain a third ceramic layer with a thickness of 0.4 mm on the other side of the second ceramic layer. Then, binder burnout was performed on the ceramic green body having a three-layer composite structure in a muffle furnace with an air atmosphere at the highest temperature of 450° C. for 4 h. Then, an oxygen inlet valve was closed, and the ceramic green body was sintered at 1280° C. for 2 h, to obtain a composite ceramic member. The structure of the composite ceramic member was shown in FIG. 1. Upon detection, the first ceramic layer (alumina ceramic layer) had a pore size of 6 µm, a porosity of 47%, a thermal conductivity of 1.6 W/m·K, and a compressive strength of 50 MPa. The second ceramic layer (silicon oxide ceramic layer) had a pore size of 75 µm, a porosity of 61%, a thermal conductivity of 0.4 W/m·K, and a compressive strength of 42 MPa. The third ceramic layer (silicon carbide ceramic layer) had a compressive strength of 65 MPa, a pore size of 11 µm, a porosity of 40%, and a thermal conductivity of 1.5 W/m·K.

Example 4

A first ceramic slurry, a second ceramic slurry, and a third ceramic slurry were prepared respectively using a planetary ball mill. The first ceramic slurry was an alumina slurry containing 30 wt % of a pore-forming agent, the second ceramic slurry is a silicon oxide slurry containing 50 wt % of a pore-forming agent, and the third ceramic slurry is a silicon oxide slurry containing 30 wt % of a pore-forming agent. Taking a PE film as a carrier film, the second ceramic slurry was tape cast by a casting machine into a second ceramic layer with a thickness of 0.6 mm. By using a spin coater, the first ceramic slurry was coated to one side of the second ceramic layer, and then the third ceramic slurry was coated to the other side of the second ceramic layer, so as to obtain a first ceramic layer with a thickness of 0.6 mm on one side of the second ceramic layer and a third ceramic layer with a thickness of 0.8 mm on the other side of the second ceramic layer. Then, binder burnout was performed on the ceramic green body having a three-layer composite structure in a muffle furnace with an air atmosphere at the highest temperature of 450° C. for 4 h. Then, an oxygen inlet valve was closed, and the ceramic green body was sintered at 1280° C. for 1.5 h, to obtain a composite ceramic member. The structure of the composite ceramic member was shown in FIG. 1. Upon detection, the first ceramic layer (alumina ceramic layer) had a pore size of 8 µm, a porosity of 48%, a thermal conductivity of 1.9 W/m·K, and a compressive strength of 48 MPa. The second ceramic layer (silicon oxide ceramic layer) had a pore size of 65 µm, a porosity of 60%, a thermal conductivity of 0.45 W/m·K, and a compressive strength of 40 MPa. The third ceramic layer (silicon oxide ceramic layer) had a compressive strength of 55 MPa, a pore size of 15 µm, a porosity of 45%, and a thermal conductivity of 0.5 W/m·K.

Comparative Example 1

This comparative example relates to an alumina ceramic body having a one-layer structure. Specific preparation steps are as follows. An alumina slurry containing 50 wt % of a pore-forming agent was prepared using a planetary ball mill. Taking a PE film as a carrier film, the above slurry was tape cast by using a casting machine, laminated, and sintered into a ceramic body with a thickness of 2 mm. Upon detection, the alumina ceramic body had a pore size of 50 µm, a porosity of 65%, a thermal conductivity of 1.7 W/m·K, and a compressive strength of 30 MPa.

Comparative Example 2

This comparative example relates to a silicon oxide ceramic body having a one-layer structure. Specific preparation steps are as follows. A silicon oxide slurry containing 50 wt % of a pore-forming agent was prepared using a planetary ball mill. Taking a PE film as a carrier film, the above slurry was tape cast by using a casting machine, laminated, and sintered into a ceramic body with a thickness of 2 mm. Upon detection, the silicon oxide ceramic body had a pore size of 45 µm, a porosity of 40%, a thermal conductivity of 0.4 W/m·K, and a compressive strength of 60 MPa.

Test Example 1

Conductive films were printed on surfaces of the composite ceramic members prepared in Examples 1 to 4 and the ceramic bodies prepared in Comparative Examples 1 to 2 respectively by using a semi-automatic printing machine, a 200-mesh screen and a nickel-chromium conductive slurry. The conductive films obtained by printing had a resistance value of 1Ω, and a matrix strength and an oil guide speed were tested. Then, a current impact test was carried out under a direct-current (DC) constant voltage power supply (load power of 6.5 W), a compressive strength test was carried out using an electronic universal testing machine, a test was carried out using a self-made oil guide speed test device, and a current on-off test was carried out under an Agilent DC regulated power supply. Test results were shown in Table 1 below.

TABLE 1

|  | Number of on-off cycles | Matrix compressive strength, MPa | Oil guide speed, mg/(cm² · min) |
| --- | --- | --- | --- |
| Example 1 | 1600 open-circuit failures | 60 | 13-15 |
| Example 2 | 1650 open-circuit failures | 61 | 12-14 |
| Example 3 | 1550 open-circuit failures | 62 | 11-13 |
| Example 4 | 1700 open-circuit failures | 61 | 13-15 |
| Comparative Example 1 | 500 open-circuit failures | 30 | 13-15 |
| Comparative Example 2 | 1500 open-circuit failures | 60 | 8-10 |

As can be seen from Table 1, the numbers of on-off current cycles of the composite ceramic members in Examples 1 to 4 in the current impact test all exceed those in Comparative Examples 1 to 2, which proves that the composite ceramic member according to the present disclosure has strong power-on resistance to dry burning as well as a high matrix compressive strength and a high oil guide speed.

Test Example 2

1000 samples of the composite ceramic members were prepared respectively according to the methods in Example 1 and Comparative Examples 1 to 2, conductive films were printed on surfaces of the samples according to the method in Test Example 1 respectively, and resistance consistency of the conductive films was measured using an RM3544 micro-resistance meter of HIOKI. Test results were shown in Table 2 below.

TABLE 2

|  | Target resistance of sample, Ω | Calculate an average value of 1000 pcs of products | Calculate a standard deviation of 1000 pcs of products |
|---|---|---|---|
| Example 1 | 1.10 | 1.10 | 0.032 |
| Comparative Example 1 | 1.10 | 1.15 | 0.224 |
| Comparative Example 2 | 1.10 | 1.16 | 0.320 |

As can be seen from Table 2, the resistance consistency is better after the conductive film was printed on the surface of the composite ceramic member according to the present disclosure, which is conducive to improving the stability of atomization and optimizing an atomization effect.

Test Example 3

Conductive films were printed on surfaces of the composite ceramic members prepared in Examples 1 to 4 and the ceramic bodies prepared in Comparative Examples 1 to 2 respectively according to the method in Test Example 1, then an atomization test was carried out, and the highest dry burning temperature and a temperature gradient of the conductive film at power of 6.5 W were measured by a PI infrared thermal imager. Test results were shown in Table 3 below.

TABLE 3

|  | Highest temperature, ° C. | Temperature gradient of atomization surface, K/mm |
|---|---|---|
| Example 1 | 548.65 | 253.31 |
| Example 2 | 523.44 | 235.22 |
| Example 3 | 573.46 | 238.06 |
| Example 4 | 500.28 | 219.39 |
| Comparative Example 1 | 912.75 | 448.11 |
| Comparative Example 2 | 838.65 | 485.05 |

As can be seen from Table 3, the composite ceramic member according to the present disclosure may effectively disperse the heat of the conductive film, so that the temperature is distributed more uniformly, and the dry burning temperature is lower, which is conducive to preventing the generation of burnt taste.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the invention. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A composite ceramic member, comprising:
a first ceramic layer;
a second ceramic layer; and
a third ceramic layer sequentially stacked;
wherein among the first ceramic layer, the second ceramic layer, and the third ceramic layer, the first ceramic layer has a smallest pore size and a highest thermal conductivity, the second ceramic layer has a largest porosity, and the third ceramic layer has a highest compressive strength,
wherein at least one of: the first ceramic layer having a pore size ranging from 5 μm to 9 μm and a thermal conductivity ranging from 1.5 W/m·K to 2.0 W/m·K; the second ceramic layer having a porosity ranging from 55% to 65%; or the third ceramic layer having a compressive strength ranging from 50 MPa to 70 MPa.

2. The composite ceramic member according to claim 1, wherein the first ceramic layer has a thickness ranging from 0.1 mm to 0.7 mm.

3. The composite ceramic member according to claim 1, wherein the second ceramic layer has a thickness ranging from 0.4 mm to 1.2 mm.

4. The composite ceramic member according to claim 1, wherein the second ceramic layer has a pore size ranging from 20 μm to 200 μm.

5. The composite ceramic member according to claim 1, wherein the third ceramic layer has a thickness ranging from 0.3 mm to 1.5 mm.

6. The composite ceramic member according to claim 1, wherein the third ceramic layer has a porosity ranging from 30% to 50%.

7. The composite ceramic member according to claim 1, wherein the third ceramic layer has a pore size ranging from 10 μm to 100 μm.

8. The composite ceramic member according to claim 1, wherein the first ceramic layer is made of at least one material selected from the group consisting of alumina ceramic, silicon carbide ceramic, silicon nitride ceramic, and aluminum nitride ceramic.

9. The composite ceramic member according to claim 1, wherein the second ceramic layer is made of at least one material selected from the group consisting of silicon oxide ceramic, alumina ceramic, cordierite ceramic, and silicon nitride ceramic.

10. The composite ceramic member according to claim 1, wherein the third ceramic layer is made of at least one material selected from the group consisting of silicon oxide ceramic, silicon carbide ceramic, alumina ceramic, cordierite ceramic, and silicon nitride ceramic.

* * * * *